J. HILL.
FEEDING DEVICE FOR PINEAPPLE SLICERS.
APPLICATION FILED JAN. 24, 1914.
1,130,819.
Patented Mar. 9, 1915.
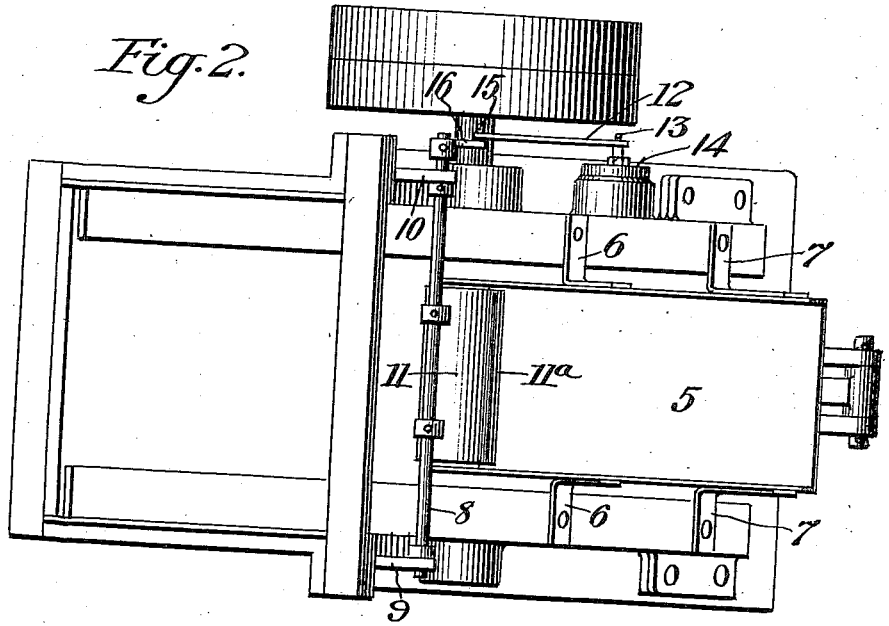
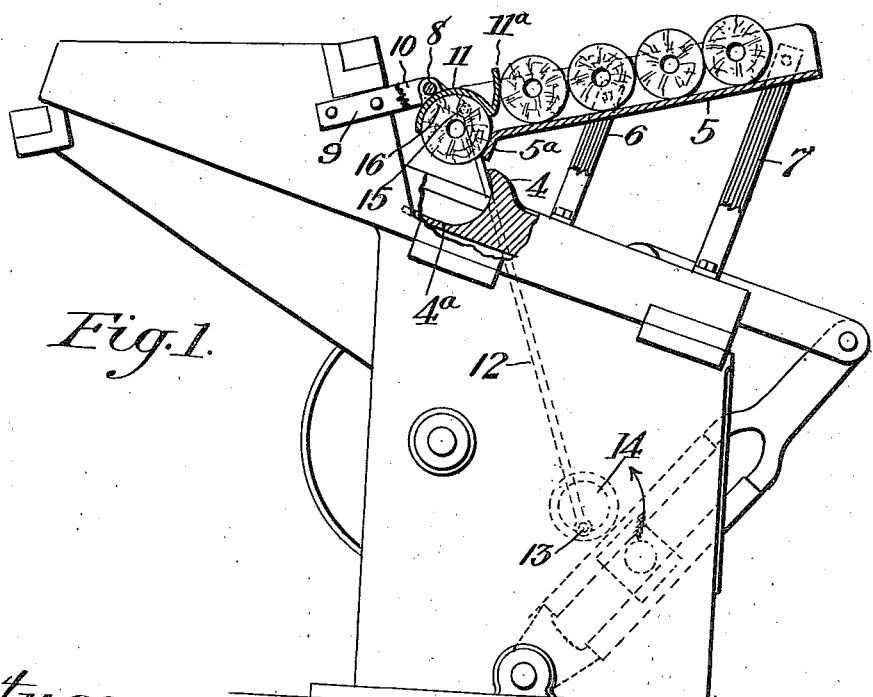

UNITED STATES PATENT OFFICE.

JOHN HILL, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

FEEDING DEVICE FOR PINEAPPLE-SLICERS.

1,130,819.

Specification of Letters Patent. Patented Mar. 9, 1915.

Application filed January 24, 1914. Serial No. 814,143.

*To all whom it may concern:*

Be it known that I, JOHN HILL, a citizen of the United States, residing at Honolulu, in the county of Honolulu and Territory of Hawaii, have invented certain new and useful Improvements in Feeding Devices for Pineapple-Slicers; and I do hereby declare the following to be a full, clear, and exact description of the invention, such as will enable others skilled in the art to which it appertains to make and use the same.

This invention relates to improvements in machines for slicing fruit, and particularly to a device for feeding pineapples to that type of such machines as is described in Letters Patent No. 930,021, issued Aug. 3, 1909, to L. E. Arnold. In pineapple slicing machines of this type, the reciprocating head receives a peeled and sized fruit, and during its forward stroke this fruit encounters a plurality of blades and is sliced thereby. It is desirable in such machines that the fruit be automatically and positively fed one at a time without damage to the fruit.

The object of my invention is to provide means of this character, which shall be simple and effective.

In the accompanying drawings, forming a part of this specification, Figure 1 represents in side elevation and partly in section a pineapple slicing machine embodying my improvements. Fig. 2 is a plan view of the same machine.

Referring to the drawings, 3 is the body of the machine, and 4 its reciprocating head, which receives its motion in the manner described in the patent above mentioned. It will be noted, however, that the lower jaw 4ª of the reciprocating head 4 is made longer and projects forward to support the fruit. The trough 5, adapted to receive the sized fruit to be sliced, is supported above the body 3 by the braces 6, 7, and is slightly inclined to the horizontal so as to cause the sized fruit when placed thereon to roll down the trough toward the feeding position. The forward end 5ª of the bottom of the trough 5 is bent downward as shown in Fig. 1. The rock-shaft 8 is journaled transversely in the brackets 9, 10, secured to opposite sides of the upper portion of the body 3. The casting 11, which is curved to fit a sized fruit, is secured to the rock-shaft 8 over the feeding position and between the brackets 9, 10, as shown. The rear portion 11ª of the casting 11 projects upward and is curved, preferably to the arc of a circle whose center coincides with that of the rock-shaft 8, to form a stop. The pitman 12 connects the pin 13, secured eccentrically in the end of the gear shaft 14 of the machine, with the pin 15 in the crank 16 fastened to the end of the rock-shaft 8, by which the latter receives its motion. The pin 13 is so located in the end of the gear shaft 14 as to be in its lowest position when the reciprocating head 4 is at the end of its rearward stroke.

In operation, the sized fruit to be sliced placed on the trough 5 roll down thereon until prevented from further movement by engaging the stop 11ª. As the slicing machine continues to operate, the pin 13, starting from the position shown in Fig. 1, in moving upward causes the pitman 12 to swing the crank 16 upward, thereby turning the rock-shaft 8 with the casting 11 attached. When the stop 11ª has thus been swung upward sufficiently to clear the lowest fruit on the trough 5, the fruit on the trough proceed to roll downward until the said lowest fruit engages the curved casting 11. As the pin 13 now moves downward, the rock-shaft 8 is swung in the opposite direction to that just described, and the fruit, which has been admitted between the curved casting 11 and the end 5ª of the trough 5, now drops into the curved end of the reciprocating head 4 and is supported by its elongated jaw 4ª. In the meantime, however, the stop 11ª has engaged the next succeeding fruit on the trough 5 and has prevented further movement of the fruit on the trough until said stop is against swung upward. The operations are repeated as described.

I claim:

1. In a pineapple slicing machine, a feed trough, a reciprocating member in front of which the fruit is deposited when so discharged from said trough, a feeding member pivotally mounted at the discharge end of said trough, said member having a concave surface to engage a single fruit and discharge it from the trough and an upwardly projecting portion to hold the adjacent fruit in the trough in proper position to be subsequently discharged by the concave surface, and means to actuate said feeding member in timed relation with said reciprocating member.

2. In a pineapple slicing machine, a reciprocating head provided with a forwardly and upwardly projecting lower jaw adapted to entirely support a fruit, whereby the fruit is reciprocated by the head and supported thereby during its reciprocation.

3. In a pineapple slicing machine, a reciprocating head, a feed trough disposed above the reciprocating head and adapted to discharge fruit in front of the reciprocating head when the same is at the end of its rearward stroke, and a feed controlling member pivotally mounted at the discharge end of said trough and operated in timed relation with the reciprocating head to discharge a single fruit in front of the head at the end of each rearward stroke of the latter.

4. In a pineapple slicing machine, a feed trough from which the fruit is discharged downwardly at one end thereof, a reciprocating member in front of which the fruit is deposited when so discharged from the trough, a feeding member pivotally mounted at the discharge end of said trough to swing about a horizontal axis, said member having a concave surface to engage a single fruit and discharge it downwardly from the trough in front of said reciprocating member and an upwardly projecting portion to hold the adjacent fruit in the trough in proper position to be subsequently discharged by the concave surface, and means to actuate said feeding member in timed relation with said reciprocating member.

5. In a machine of the kind described, a reciprocating head provided with a forwardly projecting lower jaw having an article-supporting surface, a portion of which is inclined upwardly to retain the article on the projecting jaw whereby the article is reciprocated by the head and supported thereby during its reciprocation.

In testimony whereof I affix my signature, in presence of two witnesses.

JOHN HILL.

Witnesses:
H. G. GINACA,
P. H. BURNETTE.